June 2, 1970 R. E. GOLDSCHMIDT ET AL 3,515,344

APPARATUS FOR ACCUMULATING THE SUM OF A PLURALITY OF OPERANDS

Filed Aug. 31, 1966 13 Sheets-Sheet 1

INVENTORS
ROBERT E. GOLDSCHMIDT
ROBERT J. LITWILLER
DON M. POWERS

BY Robert W. Berray

ATTORNEY

MULTIPLIER DECODER RULES

| INPUT | | | GENERAL OUTPUT | | M3 OUTPUT | |
|---|---|---|---|---|---|---|
| N | N+1 | N+2 | N | N+1 | RT. SH. 6 | RT. SH. 7 |
| 0 | 0 | 0 | 0 | 0 | | |
| 0 | 0 | 1 | 0 | +1 | | TRUE |
| 0 | 1 | 0 | 0 | +1 | | TRUE |
| 0 | 1 | 1 | +1 | 0 | TRUE | |
| 1 | 0 | 0 | −1 | 0 | COMP | |
| 1 | 0 | 1 | 0 | −1 | | COMP |
| 1 | 1 | 0 | 0 | −1 | | COMP |
| 1 | 1 | 1 | 0 | 0 | | |

June 2, 1970 R. E. GOLDSCHMIDT ET AL 3,515,344

APPARATUS FOR ACCUMULATING THE SUM OF A PLURALITY OF OPERANDS

Filed Aug. 31, 1966 13 Sheets-Sheet 9

United States Patent Office 3,515,344

Patented June 2, 1970

3,515,344

APPARATUS FOR ACCUMULATING THE SUM OF A PLURALITY OF OPERANDS

Robert E. Goldschmidt and Robert J. Litwiller, Wappingers Falls, and Don M. Powers, Poughkeepsie, N.Y., assignors to International Business Machines Corporation, Armonk, N.Y., a corporation of New York Filed Aug. 31, 1966, Ser. No. 576,401
Int. Cl. G06f 7/385
U.S. Cl. 235—175 9 Claims

ABSTRACT OF THE DISCLOSURE

A plurality of carry save adder stages, each comprised of one or more carry save adder units are arranged in a configuration which permits the summation of a plurality of plural-binary bit operands. A first plurality of carry save adder stages is arranged to reduce six operands to a first output signal representing the sum and a second output signal representing carries. A second plurality of carry save adder stages are arranged in loop fashion such that the carry and sum output of the second plurality of stages are combined with the carry and sum outputs from the first plurality of stages at the input to the second plurality of stages. Certain of the carry save adder stages are comprised of latching means to retain the data for a specified period of time. Signal delays through the second plurality of stages and the time between timing pulse inputs to the other latch stages are equal such that the outputs from the second plurality of stages representing the sum of the first plurality of operands will combine with the outputs of the first plurality of stages representing the sum of a second plurality of operands. The timing pulses, circuit delays, and latched stages permit the application of operands to the input of the adder arrangement at a rate equal to that of the delay through only the second plurality of carry save adder stages.

This invention relates to an adder arrangement, and more particularly to an adder which permits the generation of a sum for a plurality of simultaneously applied operands wherein successive pluralities of operands are applied to the adder prior to the generation of a final sum for the plurality of operands previously applied.

Multiplication of large binary numbers in digital data processing machines is a time consuming operation. Many structures have been provided for the multiply operation. Present systems usually provide multiplication systems wherein a plurality of multiplier binary bits are examined simultaneously to thereby cause multiples of a multiplicand to be added to a previously generated partial product. One such form of this type of multiply structure for binary numbers is shown in U.S. Pat. 3,115,574 entitled High Speed Multiplier by G. T. Paul et al., filed Nov. 29, 1961 and issued Dec. 24, 1963, said patent being assigned to the assignee of the present application.

In this prior multiply apparatus, a plurality of multiplier bits are examined simultaneously to generate a plurality of multiples of the multiplicand for application to a plurality of carry-save adders. A carry-save adder is an adding apparatus which can accept three binary bits of three separate operands and produce two outputs, one representing a sum value and the other representing a carry value. In the above-mentioned patent, each multiple of the multiplicand is applied to a corresponding carry-save adder as one input along with two other inputs, which normally represent the output of a previous carry-save adder. At the output of the last carry-save adder, representing the sum of three applied multiplicand multiples to the apparatus, a sum and a carry output signal is generated representing a partial product based on the previously decoded multiplier bits. This partial product is shifted a number of places dependent upon the number of multiplier bits examined and looped back to the top of the series of carry-save adders to be applied as two of the operands to the uppermost carry-save adder along with another multiplicand multiple generated as a result of examining a succeeding group of multiplier bits.

As the speed of operation of data processing systems increases, the delays caused by logic performed on data and the circuit delays caused by lengths of inter-connecting wires, the time for performing for multiplication in the manner of the prior patent becomes prohibitive. In the above-mentioned patent, the interval between the entry of a partial product at the first carry-save adder along with another multiplicand multiple, and the time at which a new partial product is formed from the last of the serially arranged carry-save adders would be prohibitive in a data processing system having cycle times in the nanosecond range.

It is therefore an object of the present invention, to provide an adder arrangement which permits the adding of a plurality of operands at a rate greatly exceeding the prior art.

Another object of the present invention, is to provide an adder arrangement especially adapted for the multiplication of two binary numbers wherein the period between application of succeeding sets of multiplicand multiples to the adding apparatus can be less than the time required for the apparatus to process a single set and add it to the previous summation.

It is a further object of this invention to provide an adder arrangement for a plurality of operands to be added wherein sums produced by a plurality of previously applied operands are added to sums created by suceeding operands by applying the previous sums to the adder apparatus at an intermediate point between the input to the adder arrangement and the output.

The foregoing objects and other features and advantages are realized in a preferred embodiment of the invention wherein the adder arrangement is comprised of input means, an adder tree, an adder loop, and timing means. In the preferred embodiment, the operand input means is effective to present at the input to the adder arrangement a plurality of plural bit operands which have been produced as a result of decoding a plurality of multiplier bits in a multiplication operation. It is the primary purpose of the adder arrangement to permit the addition of 30 operands in a time interval equivalent to two machine cycles of a data processing system. The previously mentioned adder tree is comprised of a plurality of groups of input signal lines which receive a corresponding plural bit operand from the input means. The adder tree is effective to produce at the output two groups of signal lines which, if combined in a parallel adder, would produce the sum of all of the input operands.

The two groups of signal lines produced at the output of the adder tree are applied as inputs to an adder loop. At the input to the adder loop are two additional groups of input signal lines. It is a function of the adder loop to produce two groups of signal lines which, if combined in a parallel adder, would represent the sum of the four operands applied at the input to the adder loop. The two output signal lines of the adder loop are applied as the remaining two inputs to the adder loop. The logic and circuit delays in the adder loop have a predetermined time interval. The rate at which new output signals are produced from the adder loop is equal to the rate at which new outputs are produced from the adder tree such that the sum represented at the output of the adder loop is then added to the sum represented at the output of the adder tree to produce a new sum of operands applied at the input to the adder loop.

The timing means is effective to present at the input to the adder tree, a succession of pluralities of operands, which in a multiplication operation, represent multiples of the multiplicand which must be added together to produce a final product of the binary bits of a multiplier and a multiplicand. In the preferred embodiment, six operands are applied at the input to the adder tree in five succeeding cycles to thereby produce at the final output of the adder arrangement the sum of thirty operands. After the five groups of six operands have been summed together in the adder tree and adder loop, the output of the adder loop is applied to a parallel adder which combines the two groups of output signal lines from the adder loop to produce a final single group of signal lines representing the sum of the thirty operands applied to the adder apparatus.

As another feature of the present invention, various stages of the input means, adder tree, and adder loop are comprised of latch devices which restore the integrity of the data as it flows through the structure whereby succeeding input operand sets can then be applied at a higher repetition rate. The construction of the apparatus is such that the logic and circuit delays between the inputs to succeeding latch stages is essentially equal to the time interval required for the adder loop to provide a new sum output based upon newly applied input operands.

The foregoing and other objects, features and advantages of the invention will be apparent from the following more particular description of a preferred embodiment of the invention, as illustrated in the accompanying drawings.

FIGS. *9a* and *9b* are logic diagrams depicting a portion of the operand input means utilized by the adder apparatus during multiplication and division operations.

Figures 10, 11A:
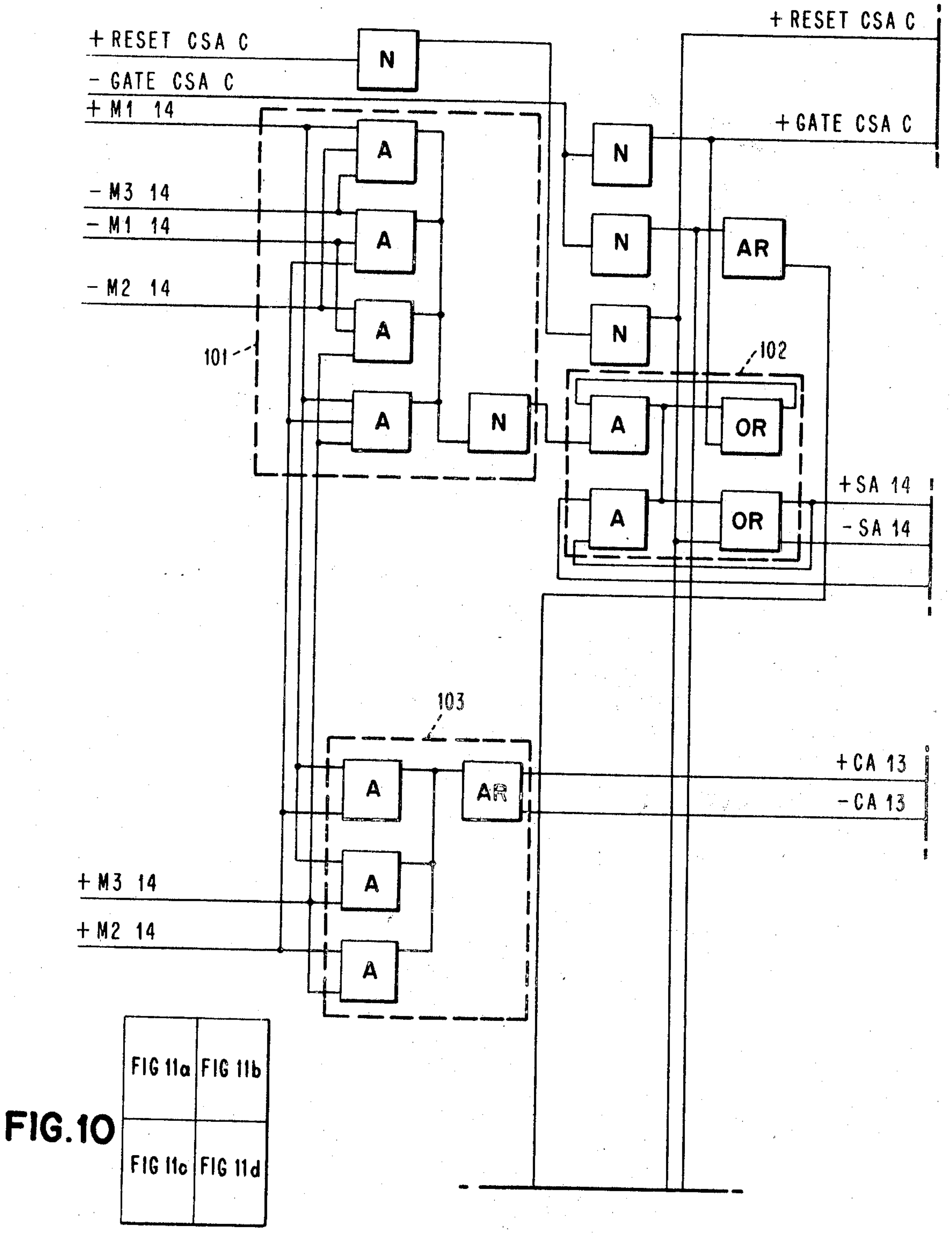

FIG. 10 is a diagram showing how FIGS. *11a* through *11d* should be arranged.

FIGS. *11a*, *11b*, *11c*, and *11d* are a schematic representation of a portion of the logic utilized in the adder tree of the adder apparatus of the present invention.

Figures 12, 13A:
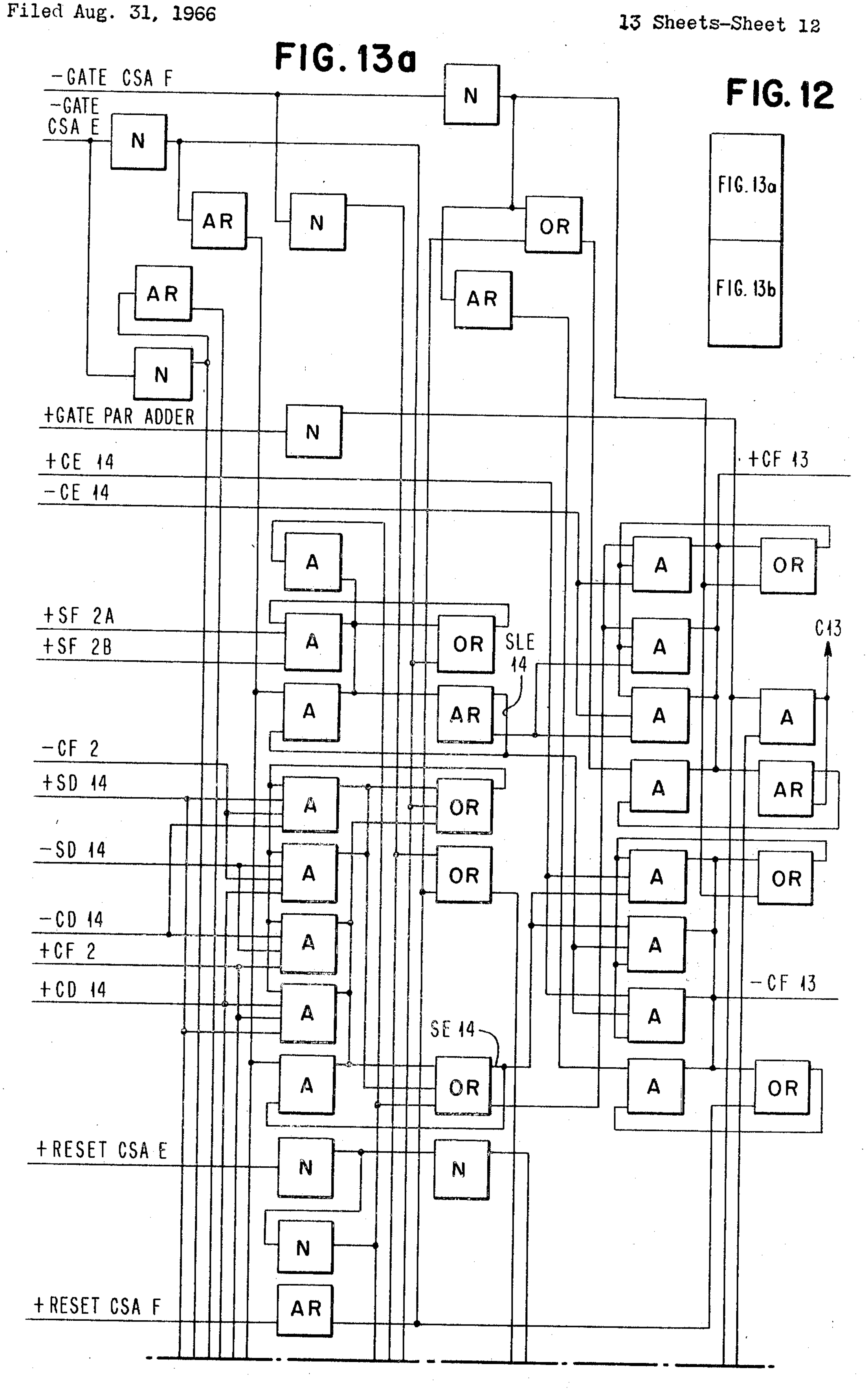

FIG. 12 shows the manner in which FIGS. *13a* and *13b* should be arranged.

FIGS. *13a* and *13b* are schematic representations of a portion of the logic utilized in the adder loop of the adder apparatus of the present invention.

Figure 1:
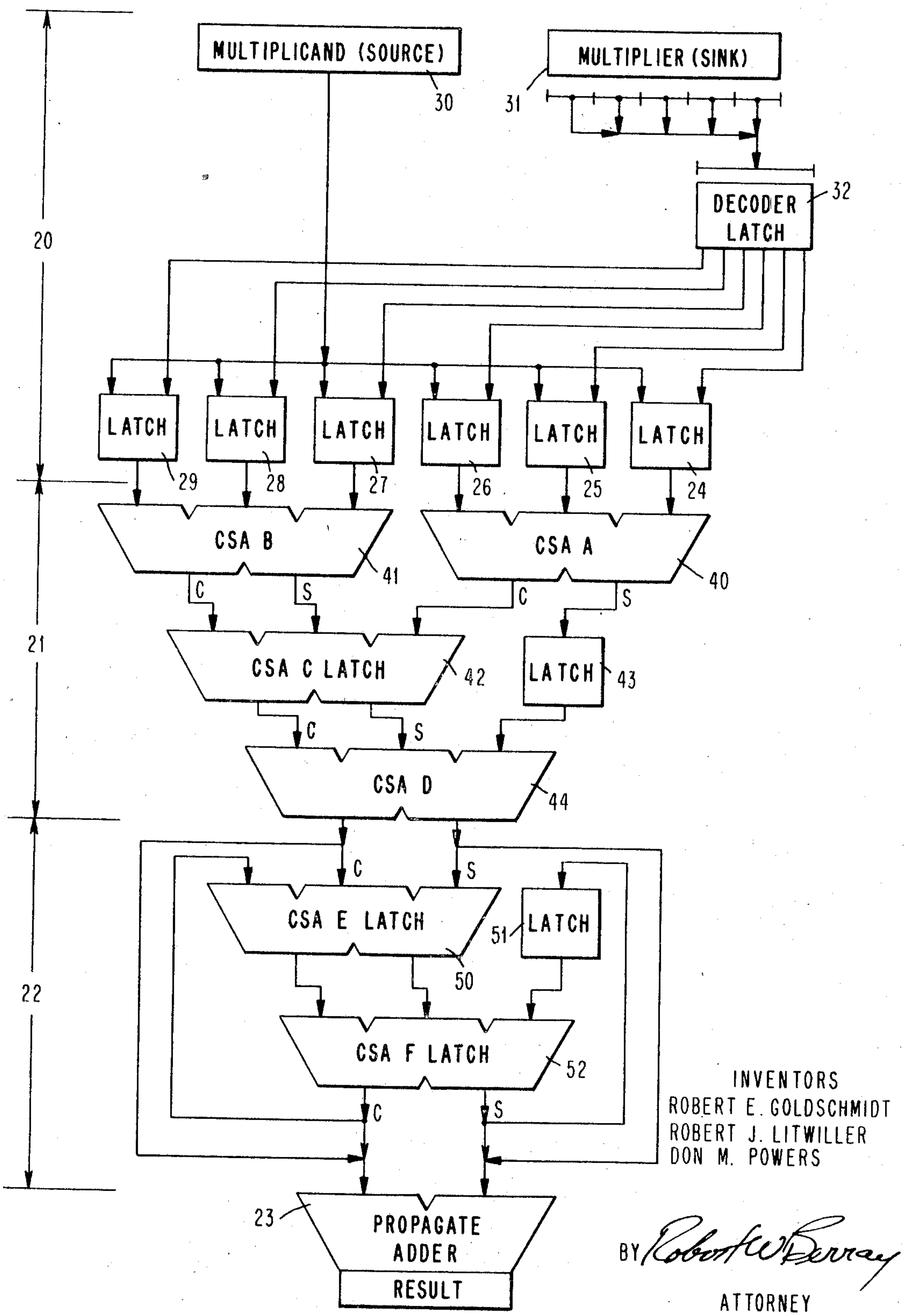
FIG. 1 is a block diagram representation of the adder apparatus of the present invention.

FIG. 1 depicts in block diagram form the essential functional units of the adder apparatus of the present invention. The general areas of the apparatus to be more fully described include operand input means 20, and adder tree 21, and adder loop 22, and a parallel propagate adder 23. Although the preferred embodiment of the present invention will be discussed in an environment wherein it is utilized to accomplish high-speed multiplication or division, the essential features of the invention can be utilized to add a plurality of operands no matter what their source. The discussion in FIG. 1 will be confined to the manner in which the structure accomplishes addition, whereas the environment of the adder arrangement in a multiply operation will be discussed with FIG. 2. In FIG. 1, the operand input means comprises a plurality of latch registers 24 through 29. Each of the latch registers is comprised of a plurality latch devices whereby a plural binary bit operand can be gated into the latch devices and stored. To be more fully discussed later, the operand input means also includes a multiplicand source 30, a multiplier source 31, and a multiplier decoder latch register 32 which receives successive sets of multiplier bits to produce successive selection signals effective to gate selected multiples of the multiplicand into the various latch registers 24 through 29.

The adder tree 21, is comprised of a plurality of carry-save adder units (CSA) arranged in a plurality of carry-save adder stages. The input stage of the adder tree is comprised of a carry-save adder 40 and a carry-save adder 41 designated in the FIG. 1 as CSA–A and CSA–B respectively. An intermediate stage of the adder tree is comprised of a carry-save adder 42, designated CSA–C and a latch register 43. The final, or output stage of the adder tree, is comprised of a carry-save adder 44 designated CSA–D.

It is the function of the adder tree 21, to receive at its input, groups of signal lines, each group representing all of the bits of the operands stored in the corresponding latch registers 24 through 29. The final output of the adder tree 21, produced by CSA–D are two groups of signal lines which, if combined in a parallel adder, would produce a single group of output signal lines representing the sum of all the operands applied at the input to the adder tree 21.

The adder loop 22 is comprised of a first and second stage of carry-save adders, the first stage of the adder loop being comprised of a carry-save adder 50 designated CSA–E and a latch register 51. The second or final stage of the adder loop 22 is comprised of a carry-save adder 52 designated CSA–F. It is the function of the adder loop 22 to receive successive outputs from the adder tree 21 at the same time as two groups of output signal lines are produced by CSA–F. Four groups of signal lines are applied to the input of the adder loop 22. These include the two groups of output signal lines from CSA–D and the two groups of output signal lines from CSA–F. The rate at which the outputs from CSA–D are produced is equal to the rate at which the adder loop 22 operates whereby successive outputs of CSA–F are applied at the input to the adder loop 22 at the same rate as successive outputs from CSA–D.

The final output of the adder apparatus of FIG. 1 is a single group of output signal lines from the parallel propagate adder 23 which combines two groups of output signal lines to produce a final sum value. As shown in FIG. 1, the parallel adder 23 receives inputs either from CSA–F or CSA–D. When the apparatus of FIG. 1 is to be utilized to produce a final sum value for only one plurality of operands applied to the latch registers 24 through 29, the parallel adder 23 will receive as inputs the outputs of CSA–D to produce a final sum value. However, if the adder apparatus of FIG. 1 is to be utilized to accumulate the sum of a plurality of operands applied in successive time periods to the latch registers 24 through 29, the adder loop 22 will be rendered effective to accumulate the sums. The output of CSA–F will be applied to the parallel adder 23 when CSA–F produces two groups of output signal lines which represent the final sum value of all the operands applied.

Each of the carry-save adders known in FIG. 1 is comprised of a plurality of orders, each order receiving three inputs, one from corresponding bit positions of three of the latch registers 24 through 29. The logic of a carry-save adder order is to receive the binary 1 or binary 0 inputs from three different operands and produce two signals at its output, one representing the sum of the binary 1's applied and the other representing a carry produced by the three inputs. A binary 1 or significant output signal representing a sum will be produced when a combination of binary 1 inputs is equal to 1 or 3, and a carry signal will be produced when 2 or 3 binary 1 inputs are present. Therefore, CSA–A produces two groups of output signal lines, one representing a sum value for the operands applied from latch registers 24, 25, and 26, and a second group of output signal lines representing the carry produced by the three operand inputs. If the sum signals and the carry signals were combined in a parallel adder, a single output would be produced representing the sum of the three operands applied at the input of the carry-save adder.

The carry-save adders of FIG. 1 operate essentially the same as the carry-save adders shown in the above-cited Pat. 3,115,574. The number of carry-save adders in any particular stage of the adder tree 21 must be sufficient to accommodate all of the sets of three groups of input signal lines. For example, the first stage of the adder tree 21 includes two carry-save adders to accommodate the six groups of input signal lines. In certain of the adder tree stages, certain groups of output signal lines from a previous adder stage cannot be included in a set of three groups of input signal lines to the particular adder stage. In this case, those groups of signal lines which are not included in a set of three groups of input signal lines are applied to a latch register. In those adder stages which require the use of a latch register, the carry-save adder orders are each comprised of a gated adder latch. The gated adder latch devices are the same as those disclosed in co-pending application Ser. No. 471,021 entitled Latched Carry-Save Adder Circuit for Multipliers by John G. Earle filed July 12, 1965, now Pat. No. 3,340,388 issued Sept. 5, 1967, and assigned to the assignee of this application. Carry-save adder 42, designated CSA–C LATCH is such a carry-save adder comprised of a plurality of the latches disclosed in the co-pending application. It is the presence of the gated adder latches and gated latch registers in the various stages of the adder apparatus of FIG. 1 which permits the application of new pluralities of operands to the latch registers 24 through 29 at a rate faster than the time interval required to produce a sum output based on the input operands. The gated adder latches as disclosed in the above-mentioned co-pending application are operative to be responsive to a gate signal and three input operands to produce an output signal representing the carry-save adder functions. The latching operation is such that the output produced will be maintained even though the gate signal disappears or the input signals change. A new output signal will not be produced until a new gate signal is provided. Therefore, the output of a gated carry-save adder latch will be maintained throughout the interval between the start of succeeding gate signals.

Figure 2:
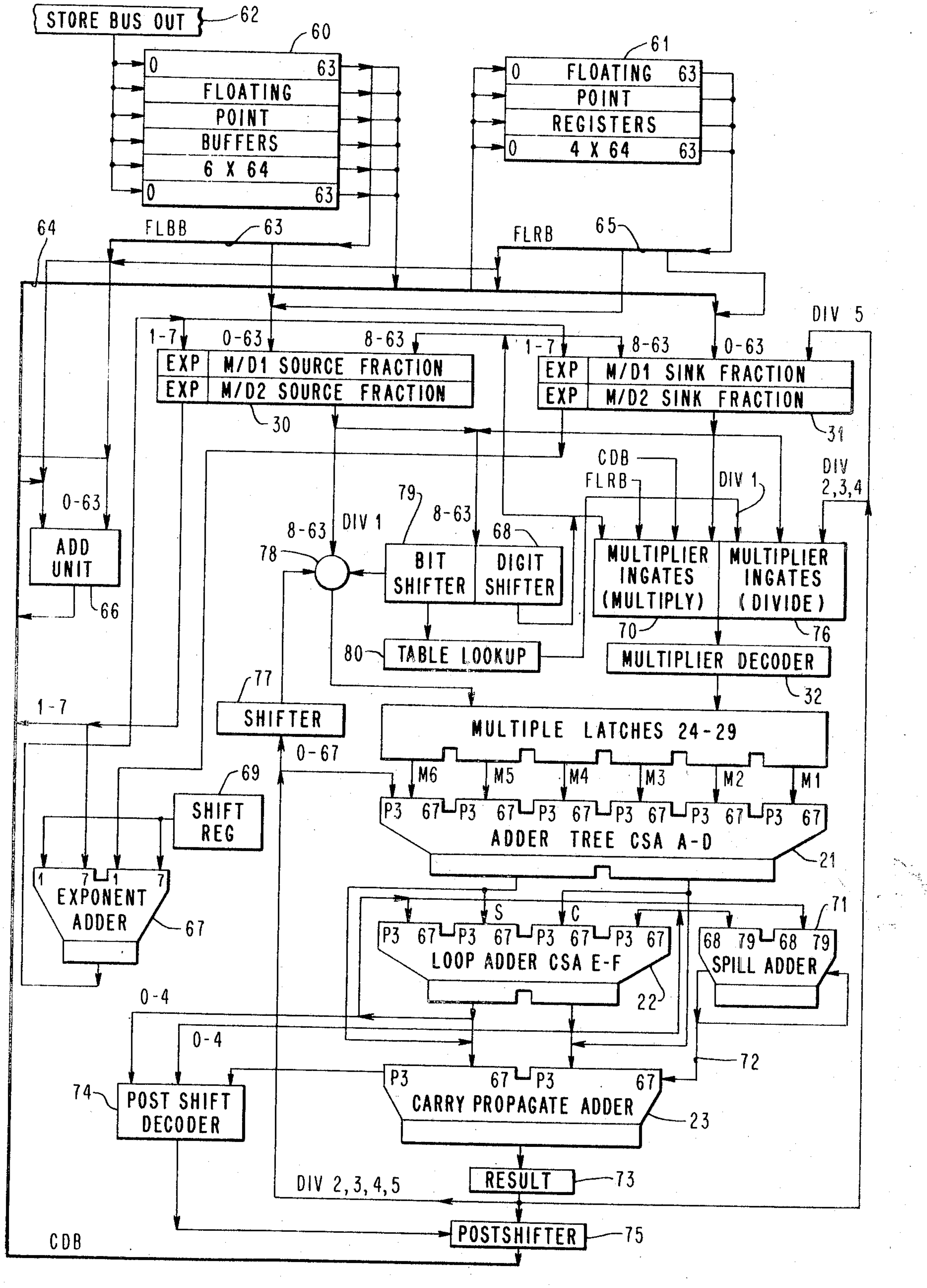
FIG. 2 is a block diagram representation of the major units of a floating point execution unit of a data processing system which utilizes the adding apparatus of the present invention to perform multiplication or division.

FIG. 2 shows in block diagram form the environment for the adder apparatus of the present invention. The present invention finds use in a floating point arithmetic unit of a data processing system where it is desired to multiply or divide floating point binary numbers. The floating point numbers to be multipled or divided consist of 64 binary bits. The highest order or bit 0 position of the floating point number represents the sign of the number. Positions 1–7 represent an exponent value to the base 16 (hexadecimal) and position 8 through 63 represent a fraction portion of the number. The fraction is comprised of 14 hexadecimal digits, each digit comprised of 4 binary bits. The radix point of the number represented is assumed to be between positions 7 and 8 in the binary number. As is well known in floating point multiply or divide, only the fraction portion of the numbers are multiplied or divided while the exponent values are added or subtracted to achieve a final exponent value. It is the purpose of the present invention then to facilitate the multiplication of two binary numbers each comprised of 56 binary bits representing the fraction portion of the number.

Before describing the remainder of FIG. 2, it will be pointed out at this time the position of the adder apparatus of FIG. 1 within the entire environment. The block diagrams in FIG. 2 have been numbered to correspond with the designations used in FIG. 1. The registers 30 and 31 are shown to be two separate registers in FIG. 2 whereby the instruction handling unit of the data processing unit will be capable of inserting two multipliers and two multiplicands in the registers 30 and 31 for action by the multiplying apparatus. Each of the registers 30 and 31 will be comprised of 64 data bits of which only positions 8 through 63 will be utilized in the adder apparatus for the purpose of multiplying or dividing the fraction portions. There is also shown in FIG. 2 the multiplier decoder 32, the latch registers 24 through 29, the adder tree 21, the adder loop 22, and the carry propagate parallel adder 23.

Additional apparatus shown in FIG. 2 include six floating point buffers 60 and four floating point registers 61 all of which are capable of buffering the 64 binary bits of floating point numbers initially received from a storage bus 62. The data in each of the floating point buffers 60 can be read out either to a floating point buffer bus (FLBB) 63 or can be read out to a common data bus (CDB) 64. The data in the floating point registers 61 can be read out to a floating point register bus (FLRB) 65. The data which is placed on the bus 63 or the bus 65 can be transmitted to an add unit 66 which does not form a part of the present invention. The add unit 66 is shown in the present environment only to suggest that floating point numbers can also be added or subtracted. The output of the add unit 66 can be placed on the common data bus 64. The multiplicand or source fraction register 30 can receive data either from bus 63 or 65. Further, the multiplier or sink fraction in registers 31 can be received from the bus 65 or from the common data bus 64.

As mentioned previously, a necessary function during multiplication or division of floating point numbers is to add or subtract exponent values. For this purpose, there is shown schematically an exponent adder 67 which performs the exponent addition or subtraction, the output of which is transmitted back to the exponent portion of the data in the registers 30 or 31. Another necessary function in most floating point arithmetic devices is a process called normalization. In the present invention, it is assumed that the fractions of the floating point numbers have been normalized. For multiply, the highest order hexadecimal digit of the floating point number must contain a binary 1. In other words, if the floating point number as received in the registers 30 or 31 does not have a binary 1 in the highest order digit, the fraction portion of the floating point numbers will be transferred out of the registers 30 or 31 to a digit shifter 68 which will recognize leading zeros in the fraction number and cause the fraction portion of the floating number to be shifted left to produce a binary 1 value in the highest order digit of the fractional number. The number of positions which must be shifted to produce a binary 1 in the highest order digit is noted and recorded in a shift register 69 associated with the exponent adder 67. The output of the shift register 69 will be utilized to modify the result of the exponent addition or subtraction to reflect the number of positions the fraction has been shifted to cause normalization.

Also shown in FIG. 2 schematically are multiplier ingates 70. To be more fully discussed, it will be shown that five iterations are required to multiply the 56-bit fractional multiplicand by the 56-bit fractional multiplier. On each iteration, 13 bits of the multiplier are examined and utilized to energize the multiplier decoder 32. On iteration 1, the multiplier ingates 70 are capable of transferring the first 13 bits of the multiplier to the decoder 32 from the common data bus 64 (CDB), the floating point register bus 65 (FLRB) or from the digit shifter 68 at the same time the fraction is being inserted in the registers 31. From then on, the multiplier ingate 70 gate succeeding groups of 13 multiplier bits to the decoder 32. The operation of the multiplier ingate 70 is essentially the same as that disclosed in the above-mentioned issued patent which examines multiplier bits in groups. On each iteration of a multiply operation, the multiplier decoder 32 will produce signals effective at the latches 24 through 29 to gate the multiplicand from registers 30 to the latches shifted by a proper amount to reflect the multiples of the multiplicand dictated by the multiplier bits examined to produce in the latch registers 24 through 29 multiples of the multiplicand designated in FIG. 2 as M1 through M6. The groups of signal lines labelled M1 through M6 are the multiples of the multiplicand which are presented as inputs to the adder tree 21 to provide an ultimate output representing the product of the multiplicand and the multiplier bits examined.

Each of the carry-save adders in the adder apparatus must be capable of handling input operands having 71 binary bit positions. The positions of the carry-save adder are labelled, from high order end to the low order end, P3, P2, P1, 0, 1 . . . 67. Although the fractional portion of the floating point number has only 56 binary bits, the decoder 32 may require the multiplicands to be shifted 11 positions to the right prior to entry into the adder tree. Likewise, in certain instances the multiples produced in the latches 24 through 29 may be complement members requiring extension of the sign positions to higher orders with the capability of handling carries from the highest order position of the adders. Thus, the reason for the positions labelled P3, P2, and P1.

An additional apparatus, which will not be further discussed, but which is required to perform multiplication is shown in FIG. 2 as a spill adder 71. The multiplier ingates 70 gate 13 multiplier bits to the decoder 32 starting at the low order end of the fraction. Thereafter, succeeding 13 bit groups are taken from groups displaced from the preceding groups by 12 multiplier bits which causes the multipliers to be examined in five groups of 12 bits. As with paper and pencil multiplication, succeeding partial products are shifted in relation to previously generated partial products. In the present embodiment of the invention, the succeeding partial products produced at the output of the adder loop 22 are shifted right 12 bit positions before being entered back into the input of the adder loop 22. This has the effect then of shifting previous partial products in relation to succeeding partial products produced by succeeding groups of multiplier bits. The 12 binary bits of the two groups of output signal lines of the adder loop 22 which have been shifted right are applied to parallel spill adder 71 which has the function of determining, at the end of the five iterations, whether or not a carry will have been produced by the addition of the bits shifted to the right. If the bits shifted to the right during the five iterations produce a carry out of the spill adder 71, this carry is applied as an input 72 to the lowest order bit position of the parallel adder 23. As in normal multiplication, if a multiplier of 56 bits and a multiplicand of 56 bits are multiplied, a final product would be produced having 112 binary bits. The number system in the data processing system used only requires the higher order 56 binary bits to produce the ultimate result fraction. The 56 low order bits which have been shifted right, as mentioned previously, enter into spill adder 71 to determine whether or not the highest order 56 bits will be affected by a carry from the lower order 56 bits.

Once a final product has been determined, it is gated from the carry propagate adder 23 to a result register 73. A post shift decoder 74 is utilized during the final product generation in the parallel adder 23 to determine whether or not the highest order 4-bit digit of the final product has a binary 1 therein and therefore represents a normalized fraction. If the post shift decoder 74 detects that the highest order 4-bit digit does not contain a binary 1, a post shifter 75 is energized to shift the entire product fraction to the left 1 digit, or 4 positions. The output of the post shifter 75 is applied to the common data bus 64 to be transferred to the floating point register 61 as the final result of the multiplication.

The environment of FIG. 2 which is essentially an apparatus for performing multiplication is also utilized for doing floating point divide operations. The divide operation utilizing the adder apparatus of the present invention is performed by doing mutlplication. The divide operation essentially is a matter of determining a reciprocal value for a divisor and thereafter utilizing the reciprocal of the divisor as a multiplier and utilizing the dividend as a multiplicand to obtain a final quotient value. For purposes of division, multiplier ingates 76 are provided for gating information to the multiplier decoder 32 during divide operations. Likewise, the divide operation requires a number of iterations wherein the output of adder tree 21 is applied directly to the parallel adder 23 and the result of this output is gated back through a shifter 77 for the purpose of entering a multiplicand into the latches 24 through 29. The shifter 77 output is applied to a schematically represented OR circuit 78. OR circuit 78 is effective to gate to the latches 24 through 29 a multiplicand used during division, or a multiplicand from the registers 30, or a multiplicand from a bit shifter 79. In divide operations, it is not enough that the highest order 4-digit group of the divisor has a binary 1. Rather, the highest order bit position of the divisor must contain a binary 1. Bit shifter 79 is capable of shifting the fraction number to ensure that a binary 1 is contained in the highest order bit position of the fraction. Another block shown in FIG. 2 is a table look-up apparatus 80 which is utilized during the first iteration in a divide operation for producing an approximate reciprocal of the original floating point divisor, the output of which is gated to the multiplier ingate 76 to the multiplier decoder 32 to be utilized as a multiplier.

Figure 3:
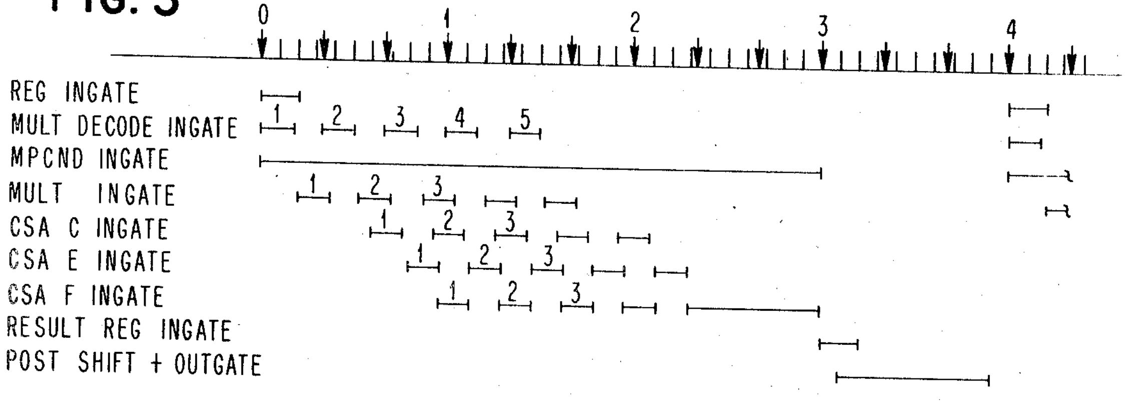
FIG. 3 is a timing diagram showing the various gating pulses utilized to cause the adder apparatus of FIG. 1 to produce a final product in the multiplication of two binary numbers.

FIG. 3 is a timing diagram showing the timing relationship between the various timing pulses or gating pulses utilized in the adder arrangement of FIG. 1. During iteration #1, representing the start of the multiply operation, the multiplier will have been gated through the shifter for normalization and a gate labelled Register Ingate will be utilized to gate the normalized multiplier back into the multiplier register 31. At the same time, a gate (MPCND INGATE) will be enabled whereby the 56-bit multiplicand in the register 30 will be gated to the latch registers 24 through 29. The multiplier decode ingate for iteration 1 is produced whereby the lowest order group of multiplier bits will be ingated to the multiplier decoder 32 latches to be retained therein. After a suitable delay, permitting the multiplier decoder 32 to operate, the multiple ingate (MULT INGATE) will be produced whereby proper multiples of the multiplicand will be entered into the appropriate latch registers 24 through 29. The latched data in the latched registers 24 through 29 is then immediately applied to the input of the adder tree comprised of CSA–A and CSA–B. After a suitable delay permitting the logic in the first stage of the adder tree to perform the summing operation, CSA–C INGATE will be produced whereby the result of the operation of CSA–A and CSA–B will be ingated to CSA–C and latch register 43. The sum *s* and carry *c* signals produced by CSA–C will be latched and retained and the outputs therefrom applied to the logic of CSA–D to produce the 2 groups of output signal lines from the adder tree 21 representing sums and carries for the original operands applied for iteration 1. After a suitable delay, representing the length of time it takes to ingate to CSA–C and latch 43 to the time that CSA–D has produced a result, an ingate is applied to carry-save adder 50 and latch register 51 (CSA–E INGATE) whereby CSA–E performs the summing logic and latches the result for application to the input of carry-save adder 52 (CSA–F). After the resolution of the sums in CSA–E, an ingate is produced at carry-save adder 52 (CSA–F INGATE).

As can be seen from FIG. 3, at the time of the entry of the multiplicand multiples into the latch registers 24 through 29 by means of the multiple ingate, the inputs to the multiplier decode can be entered for iteration 2 shortly before the end of the multiple ingate for iteration 1. In a like manner, at the time of the ingating to CSA–C based on he applied operands for iteration 1, the latch registers 24 through 29 can be modified for iteration 2. As a feature of the present invention, various latch points are provided and include the multiplier decoder 32, the latch registers 24 through 29, carry-save adder 42 and latch 43, carry-save adder 50 and latch 51, and carry-save adder 52. As a result of the various latch points, the ingate of operands to a particular latch point can be changed when a succeeding latch point has received the results generated by a previous set of operands at the particular latch point. As shown in FIG. 3, four sets of multiplier bits have been presented to the multiplier decoder 32 before the first partial product has been produced by carry-save adder 52 (CSA–F). In the prior art as represented by Pat. 3,115,574, the second set of multipler bits could not have been presented to the multiple generators until the first partial product based on the first multiplier decode had been produced.

As is readily apparent from the remainder of the representation of ingates in FIG. 3, the five groups of multiplier bits to be decoded to perform multiplication of a 56-bit number have been examined and decoded essentially at the same time that the second partial product has been generated from the application of the second set of multiplier bits. The numbers (0–4) at the top of FIG. 3 represent data processing machine cycles and show that the entire multiplication of two 56-bit binary numbers can be performed utilizing the adder apparatus of the present invention within 4 machine cycles. As will be shown subsequently, the timing means by which the multiply can be performed is a simple apparatus merely requiring the generation of five iteration ingates to the multiplier decode ingate with sequential stages of delay for utilizing the same pulse, as the ingate to succeeding latch stages.

Figure 4:
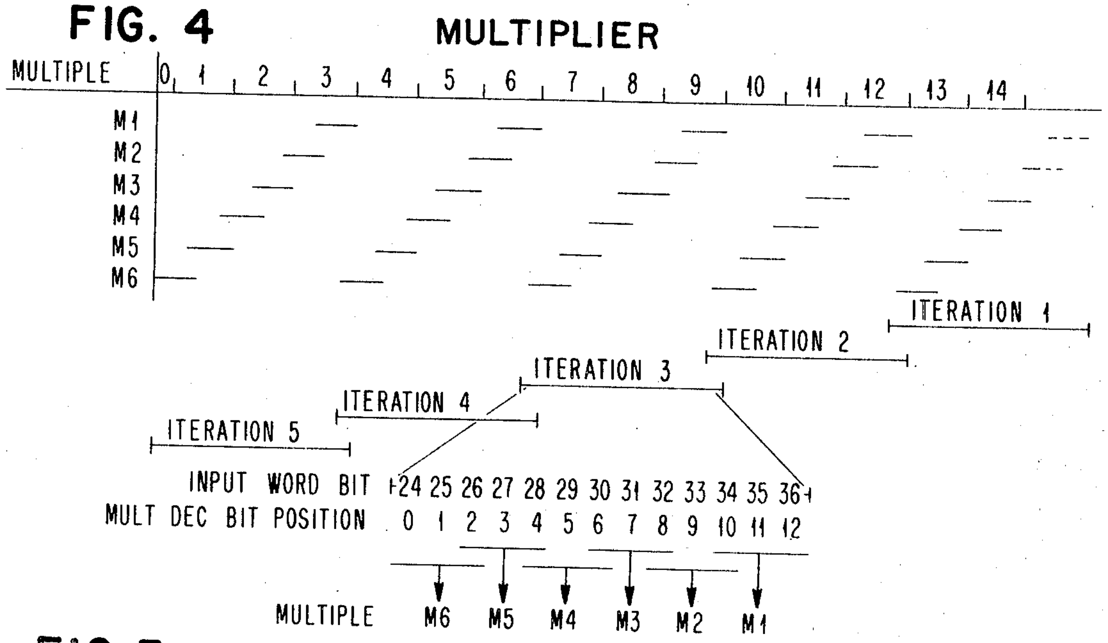
FIG. 4 is a representation of the groups of multiplier bits simultaneously examined in five succeeding iterations to cause multiples of the multiplicand to be applied as inputs to the adder apparatus of FIG. 1.

FIG. 4 is a representation of a 56-bit multiplier showing the manner in which the multiplier bits are examined in groups of 13, with succeeding groups overlapping by 1 binary bit. The last iteration, or iteration 5, uses position 8 of the floating point number and utilizes an assumed binary 0 for the highest order position of the multiplier. Starting at the left of the multiplier, and proceeding in groups of 13 binary bits, with each succeeding group overlapping by 1 binary bit, the final group of multiplier bits to be examined during iteration 1 assumes binary 0's for generating multiple M1 and uses a single binary bit of the multiplier for generating multiple M2. The numbers 1–14 represent the 14 hexadecimal digits of the multiplier.

It should be remembered that the fractional portion of the floating point number is in fact a fraction such that multiplication of a fraction by another fraction produces a smaller fraction. In a like manner, if a multiplicand were to be multipled by the lowest order, or right hand binary bit of the multiplier, the multiplicand would be shifted to the right in effect causing a division of the multiplicand by $2^{56}$. However, as mentioned previously, partial products generated at the output of the adder loop are shifted right 12 bit positions corresponding to 12 bits of the multiplier utilized on each iteration such that the product formed by the multiplier is properly factored to account for the multiplication of one fraction by another fraction.

FIG. 4 depicts the actual multiplier bits examined during iteration 3. During iteration 3, the multiplier bits 24 through 36 will be gated to the multiplier decoder 32. The multiples M1 through M6 of the multiplicand applied to latch registers 24 through 29 respectively are produced by examining 3 multiplier bits, with the highest order multiplier bit in one particular group being in common with the lowest order multiplier bit in a next succeeding higher order group of multiplier bits.

Figure 5:
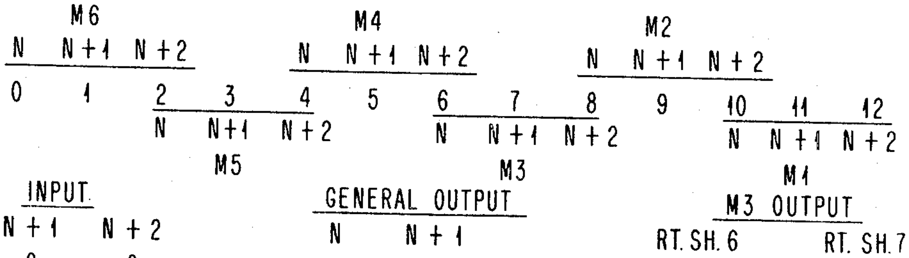
FIG. 5 is a table representing the decoding of a group of multiplier bits to produce output signal representing multiples of the multiplicand to be applied to the adder apparatus.

FIG. 5 indicates how the 13 multiplier bits are decoded on each iteration. The numbers 0 through 12 represent the 13 multiplier bits examined on each iteration. Multiple M1 is shown to be a function of multplier bits 10, 11 and 12 for each iteration, and in accordance with FIG. 4 for iteration 3, these are actually multiplier bits 34, 35, and 36. The six groups of multiplier bits examined on each iteration are shown in FIG. 5. In the lower portion of FIG. 5 there is shown the general inputs to each of the multiple decoders M1 through M6. These inputs are N, $N+1$, $N+2$. The input to the decoder is shown to be capable of assuming 8 permutations. The highest order bit of the group (N) overlaps with the lowest order bit of the next succeeding higher order group ($N+2$). Well known algorisms can be utilized for determining the proper amount of shift to be applied to the multiplicand for entry into any particular latch register to represent a multiple of the multiplicand. At least one algorism utilizes the three multiplier bits in a particular group to produce a 2 output signal as indicated in FIG. 5 and labelled GENERAL OUTPUT. The values N, and $N+1$ under the general output represent the positional value of the multiplier bit in the group of 13 multiplier bits. The designation 0, $+1$ or $-1$ in a particular column designates what must be accomplished in the gating of the multiplicand to the particular latch register. In other words, if N and $N+1$ are both 0, 0's are gated to the latch register. A column designation of $+1$ indicates that the multiplicand is to be shifted $N+1$, or N positions to the right in true form to the latch register. A designation of $-1$ indicates that the multiplicand to be shifted right N positions or $N+1$ positions in complement form.

The 2 output signals of the multiplier decoder 32 for the gating of the multiplicand into latch register 26 which receives multiple M3 is shown in FIG. 5. The value N, and $N+1$ in this case are the binary values in positions 6 and 7 respectively of the group of multiplier bits being examined. It can be seen, therefore, that based on the binary permutations of the binary bit positions 6, 7 and 8 in the decoder 32, a multiplicand will be entered into the latch register 26 shifted right 6 or shifted right 7, either in true or complement form, to thereby properly reflect the result of multiplying the multiplicand with multiplier bits 30, 31, and 32. As can be seen in connection with multiple M1, the multiplicand may be shifted into the latch register 24 up to 11 positions dictating the need for extending the number of adder positions 11 positions more than the normal 56 bit size of the multiplicand.

In connection with multiple M3 in iteration 3, it can be seen that the multiplicand should be multiplied times $2^{-30}$ of $2^{-31}$ in accordance with the rules for multiplying one fraction by another fraction. Although the decoder output for multiple M3 only causes a shift of the multiplicand by either 6 or 7 positions to the right, the ultimate output of the partial product product by the operands presened in iteration 3 is shifted right a total of 24 bit positions during iterations 4 and 5 at the output of the adder loop 22. Therefore, the partial product generated by the operands from iteration 3 will be properly factored to reflect a multiplication by $2^{-30}$ or $2^{-31}$.

Figure 6:
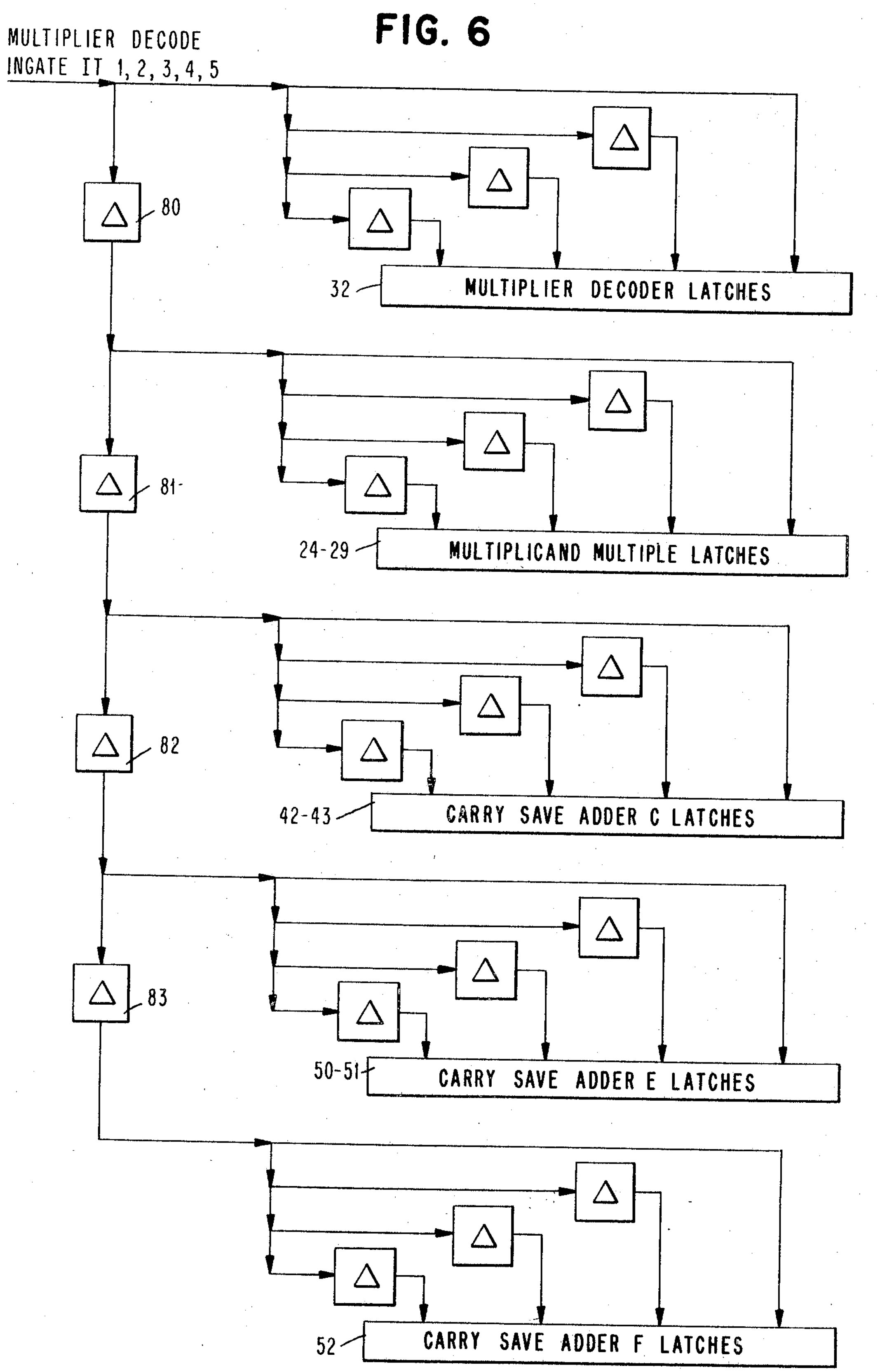
FIG. 6 is a schematic representation of the timing means in the present invention which causes intermediate results in the adder apparatus to be entered into succeeding latch devices permitting the simultaneous generation of succeeding partial products in a multiply operation.

The easily implemented timing means to perform multiplication is shown in FIG. 6. The various gated latch devices are shown in FIG. 6 and include the multiplier decoder latches 32, the multiplicand multiple latch registers 24 through 29, the carry-save adder latches 42 and latch register 43, the carry-save adder latches 50 and latch register 51, and the carry-save adder latches 52. Each multiplier decode ingate shown in FIG. 3 is not only utilized to ingate the proper multiplier bits to the decoder 32 but it is also applied to a series of delay devices 80 through 83 to produce, sequentially, the proper ingates in response to each multiplier decode ingate. As another feature of the implementation of the preferred embodiment of this invention, the logic design of the adder apparatus is such that several logic component mounting boards were required to produce each of the stages of latch devices. Since data processing machines are operating at increasingly faster rates of speed, the propagation of pulses along lengths of wire becomes a factor. Therefore, to insure that the ingate signals to a particular set of latches arrive at all of the latch devices at the same time, various amounts of delay are also applied to each of the ingate signals of the particular set of latches to reduce the skew or out-of-synchronism effect, produced by the delays along lengths of wires.

Further, in implementing the preferred embodiment of the present invention, it was discovered that by planned circuit and logic design, the delay caused by logic levels plus lengths of wire between logic levels could be made essentially equal from one latch input to the next latch input. For example, in a preferred embodiment of the invention as implemented, there are either four logic levels between succeeding latch inputs or three logic levels and a length of wire producing a propagation delay essentially equal to one logic level. In addition, it is found that the logic required to implement the adder loop 22 of FIG. 1 produces the same amount of delay.

By reason of the various succeeding stages of gated latch devices or gated adder latches, and the substantially equal signal delays between inputs to the succeeding gated latch devices, the rate at which pluralities of operands can be presented at the input to the adder apparatus can be at a rate substantially equal to the logic and circuit delays between gated latch device inputs. This permits the pipeline effect of the adder apparatus of FIG. 1 wherein the latching of outputs produced by a particular gated latch can be utilized in succeeding stages simultaneously with the ingating of a new series of inputs at a preceding stage.

Figure 7:
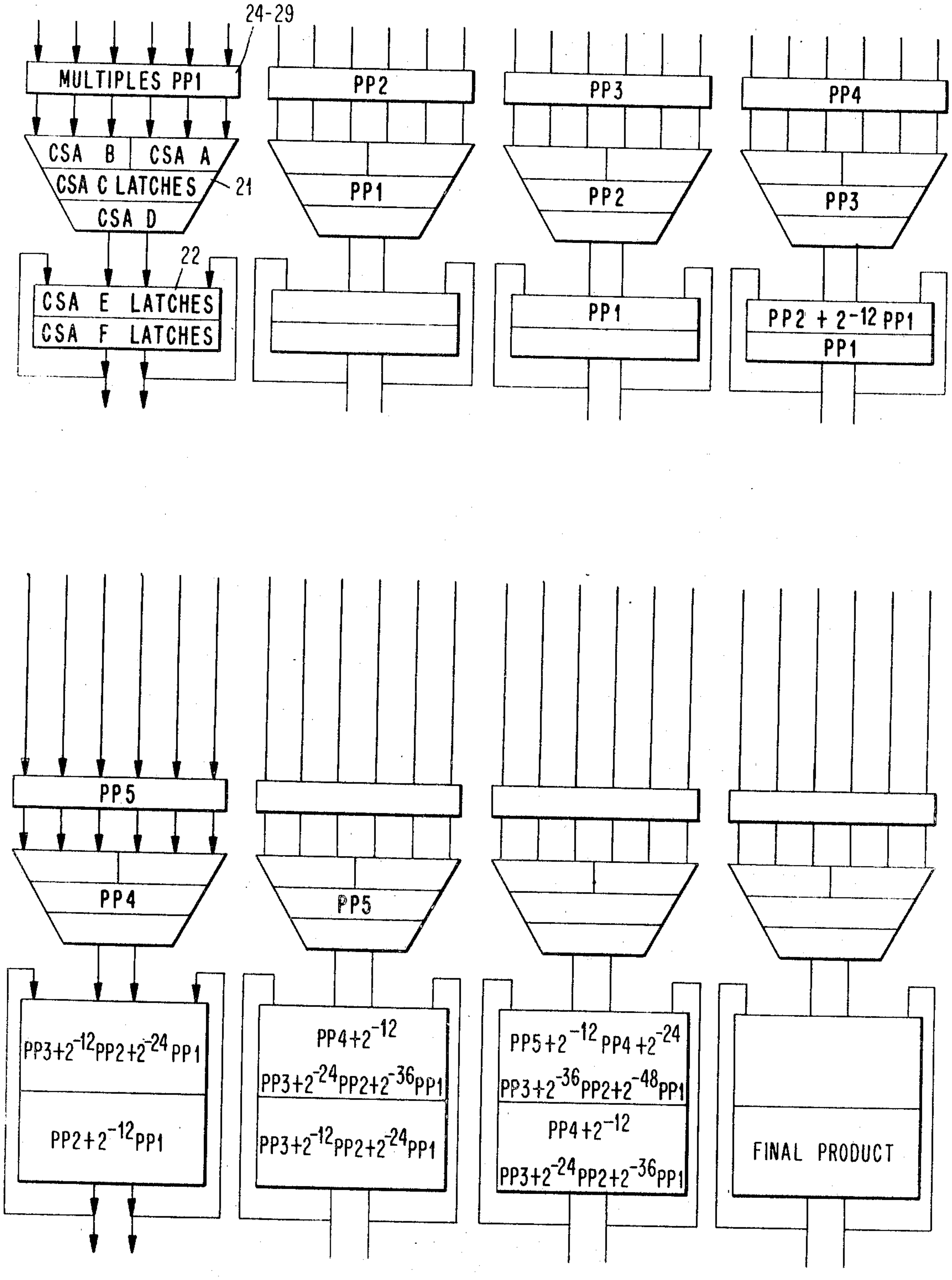
FIG. 7 is a schematic representation of the manner in which the adding apparatus of FIG. 1 produces succeeding sums of partial products based on the successive application of a plurality of multiplicand multiples produced as a result of decoding successive groups of multiplier bits to ultimately produce a final product.

The manner in which the pipe-line effect is utilized is depicted in the schematic representation of FIG. 7. In the upper left-hand representation there is shown the latch registers 24 through 29, the adder tree 21 and adder loop 22. There is also shown the first set of six operands being applied to the latch registers 24 through 29 which will be utilized to generate a partial product for iteration 1 (PP1). In the next drawing, an ingate of PP1 has been made to CSA–C and latch register 43 at the same time a succeeding plurality of operands has been entered into the latch registers 24 through 29 which will ultimately produce a sum representing a partial product for iteration 2 (PP2). At the time of entry of PP1 into the CSA–E latches a third plurality of operands have been applied to the latch registers 24 through 29. At the time of entry of the six operands into the latch registers 24 through 29 for iteration 4 (PP4). PP1 has been ingated to CSA–F to produce an output therefrom gated back to the input of CSA–E. At the moment of ingating PP2 to CSA–E latches, the binary bits representing PP1, shifted right 12 positions is also ingated to CSA–E.

The successive gating of a plurality of operands to the latch registers proceeds simultaneously with the successive gating of intermediate results from one set of gated latches to the next set of gated latches along with the shifting of the output of the adder loop right 12 positions to the input to the adder loop until a final product representation is ingated to CSA–F. At this time, the two groups of output signal lines from carry-save adder 52 (CSA–F) are applied to the parallel propagate adder 23 to produce a final product result.

FIGS. 8 through 13 will be utilized to show a portion of the binary logic required for generating a single output bit from the adder loop 22 of FIG. 1, starting with the gating of multiplier bits into the multiplier decoder latches 32. The basic logic block utilized in inmplementing the preferred embodiment of the invention is classified as an AND-INVERT. In all the logic blocks shown, inputs enter at the left of the block and outputs exit at the right. Depending on the positive or negative sense of the inputs as desired to represent the true logic function, the AND-INVERT can be made to perform either the AND function or the OR function. The particular logic most often performed is the AND function (A). In the AND function, if all inputs to the logic block are at a negative level, the upper output of the block will be at a positive level. Stated conversely, if any input to the block is positive, the upper output of the block will be negative. This is the OR function and is performed by the blocks labelled (OR).

Blocks labelled N, are essentially inverters wherein a negative input will produce a positive output and vice versa. On some of the logic blocks, it can be seen that there are two output signal lines. These are complementary outputs wherein if the upper output is negative the lower output will be positive and vice versa. Certain of the logic blocks are labelled AR and are essentially used for powering, or for producing complementary output signals in response to a single input signal.

Figures 8, 9A:
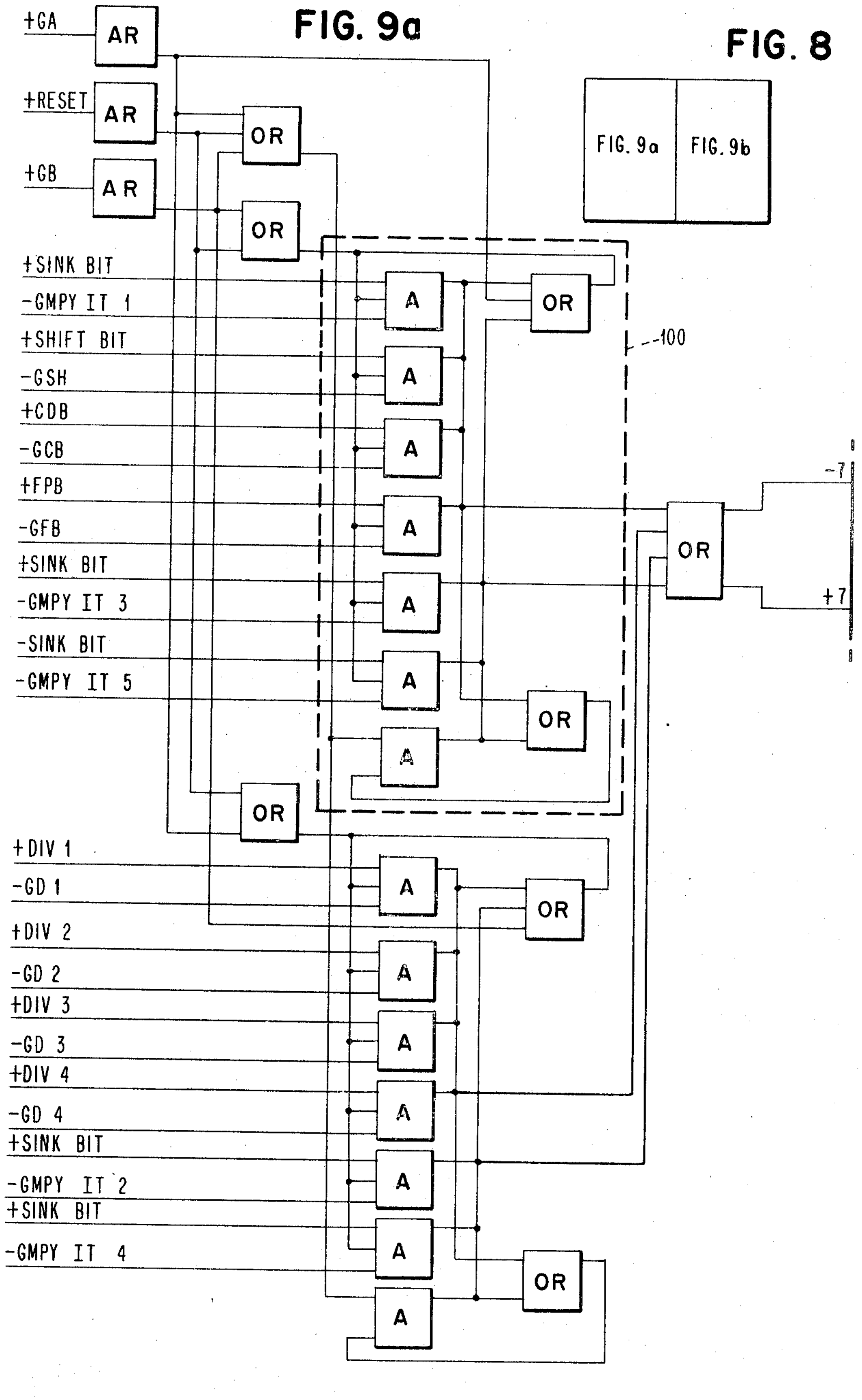
FIG. 8 shows the manner in which FIGS. *9a* and *9b* should be arranged.
Figure 9B:
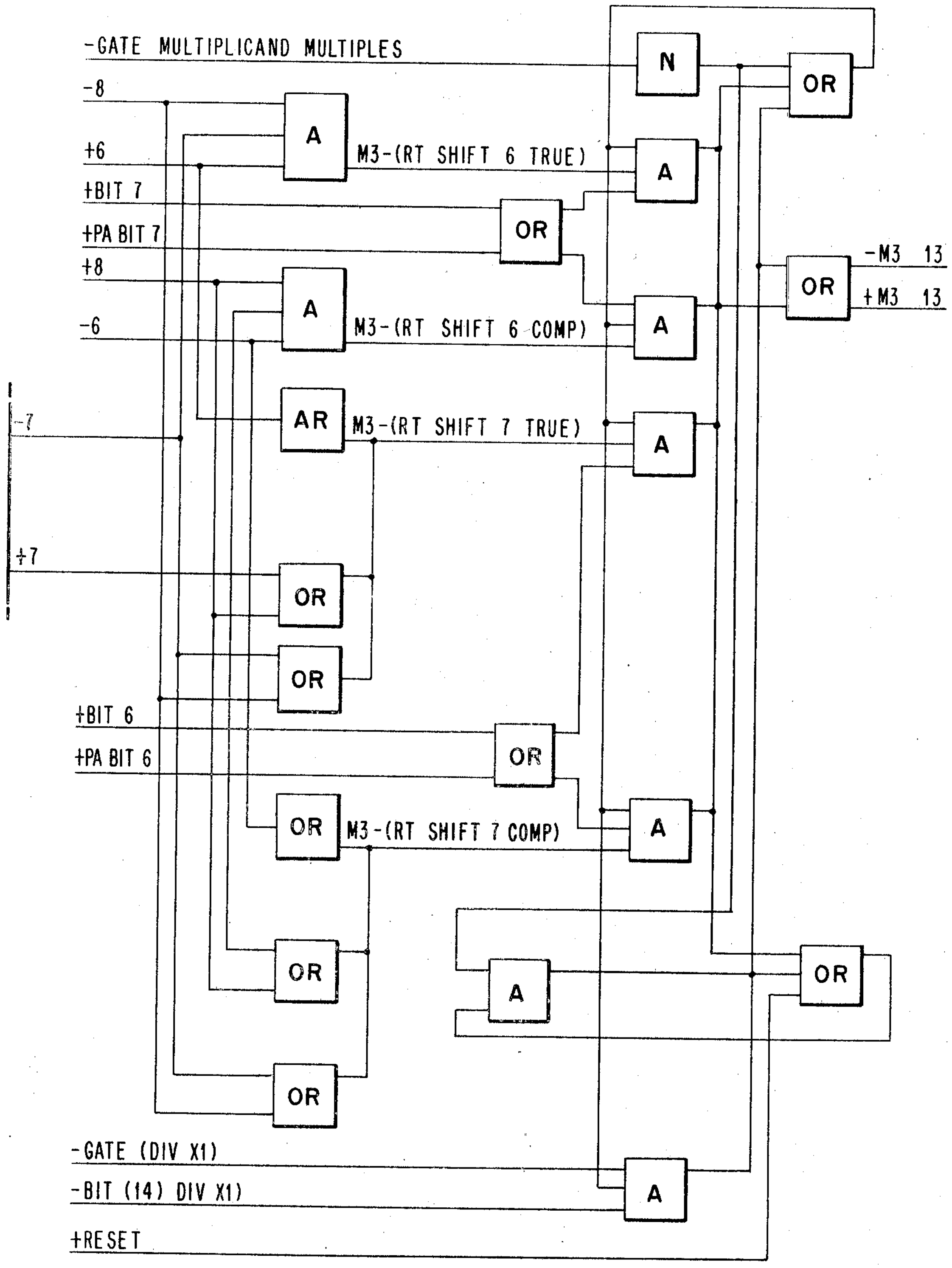

FIGS. *9a* and *9b* when arranged in accordance with FIG. 8 depict the essential logic utilized in the operand input means of the present multiplication environment. All the gated latch devices including the gated adder latches or the gated latch registers are essentially the same as that shown in the dotted area 100 in FIG. *9a*. This latch device is essentially the same as that shown in the above-cited co-pending application Ser. No. 471,021.

The output of FIG. *9b* labelled −M3 13 and +M3 13 signal the binary 1 or binary 0 output of latch register 26 position 13 representing multiple M3. The binary condition of the latched output of position 13 for multiple M3 will be either the true or complement form of multiplicand bit 6 or multiplicand bit 7 as represented by inputs +bit 6 and +bit 7 in FIG. *9b*. Another possible input comes from the parallel adder 23 of FIG. 1 during divide operations and are represented by the inputs +PA bit 6 or +PA bit 7. One input to FIG. *9b* comes from FIG. *9a* and is labelled +7 or −7. This corresponds to another set of inputs +6 or −6 and +8 or −8. These inputs represent the multiplier positions 6, 7 and 8 utilized for generating the multiple M3 and will be utilized in the logic of FIG. *9b* to determine whether or not the multiplicand or the parallel adder output should be right shifted 6 positions or right shifted 7 positions in true or complement form in accordance with the rules shown in FIG. 5.

The logic shown in FIG. *9a* is essentially a gating and latching function whereby the proper multiplier bits for a particular multiply iteration cycle are applied to the multiplier decoder line to produce the output signals for multiplier decoder position 7 of all of the iteration cycles. The ingating of multiplier bits to the decode logic is performed by a +GA or +GB representing alternate A and B cycles of an ingate to the decoder latch 32 of FIG. 1. The various multiplier bits utilized for positions 7 of the multiplier decoder bit positions include bits from the multiplier register 31 represented by the input signals labelled +sink bit; +shift bit when gating in the output of the shifter 68 of FIG. 2 during the first iteration cycle; the proper multiplier bit from the common data bus 64 represented by the input +CDB; from the floating point buffer bus 63 represented by the input +FPB. Also entering into the multiplier decode position 7 will be various intermediate results during divide operations represented by inputs such as +DIV 1 and −GD 1 representing the ingate for divide iteration cycle 1. The ingates for the various iterations during multiply are represented by inputs such as −GMPY IT 1 and −GMPY IT 2.

Figure 11B:
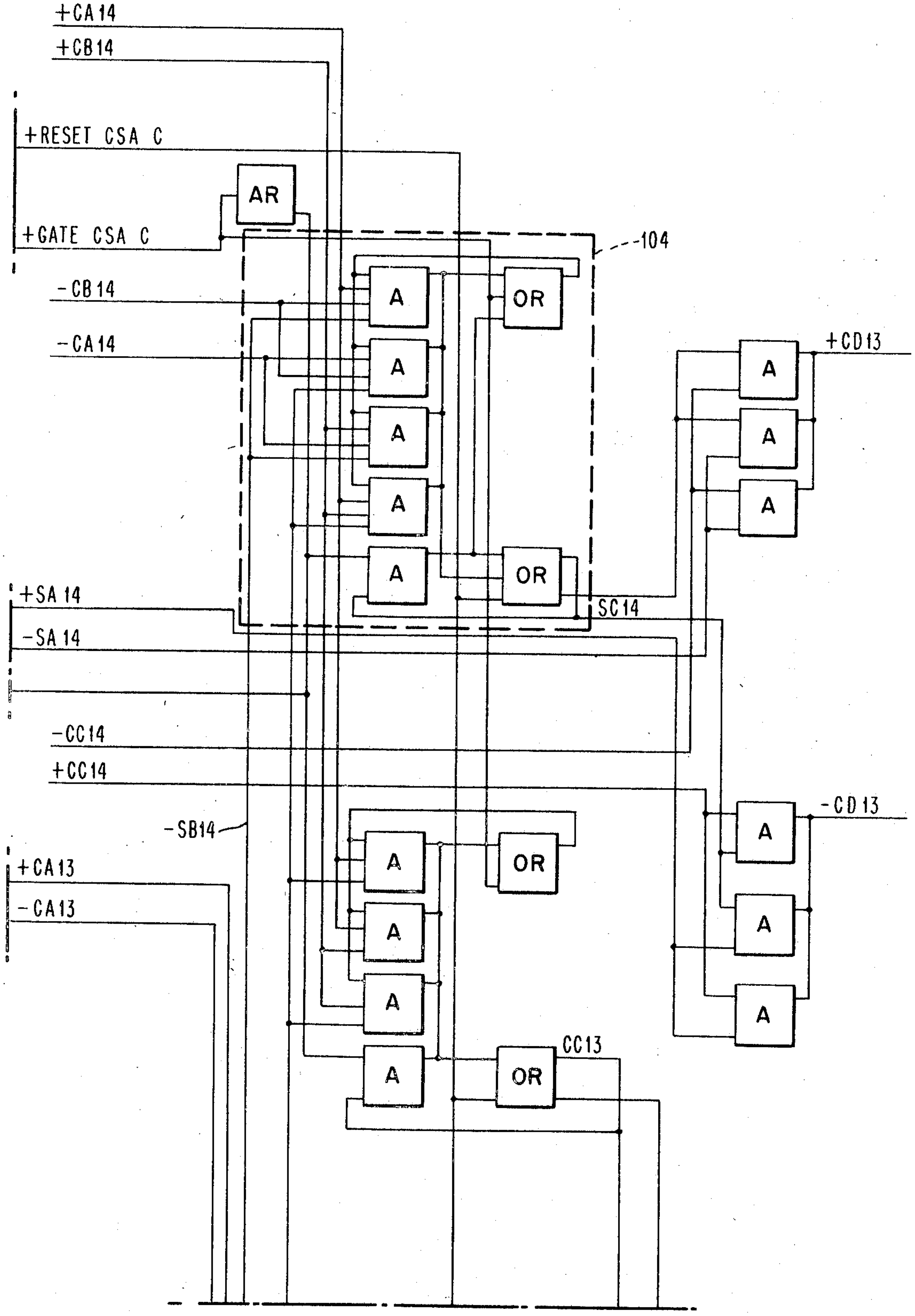

When FIGS. 11*a* through 11*d* are arranged in accordance with FIG. 10, there is shown a portion of the logic required to produce a single bit output from carry-save adder 44 (CSA–D). FIG. 11*b* shows output labelled +CD 13 and −CD 13 representing the carry function output for bit position 13 from carry-save adder 44. The outputs from FIG. 11*d* labelled +SD 13 and −SD 13 represent the sum function output for bit position 13 of carry-save adder 44 (CSA–D).

Figure 11C:
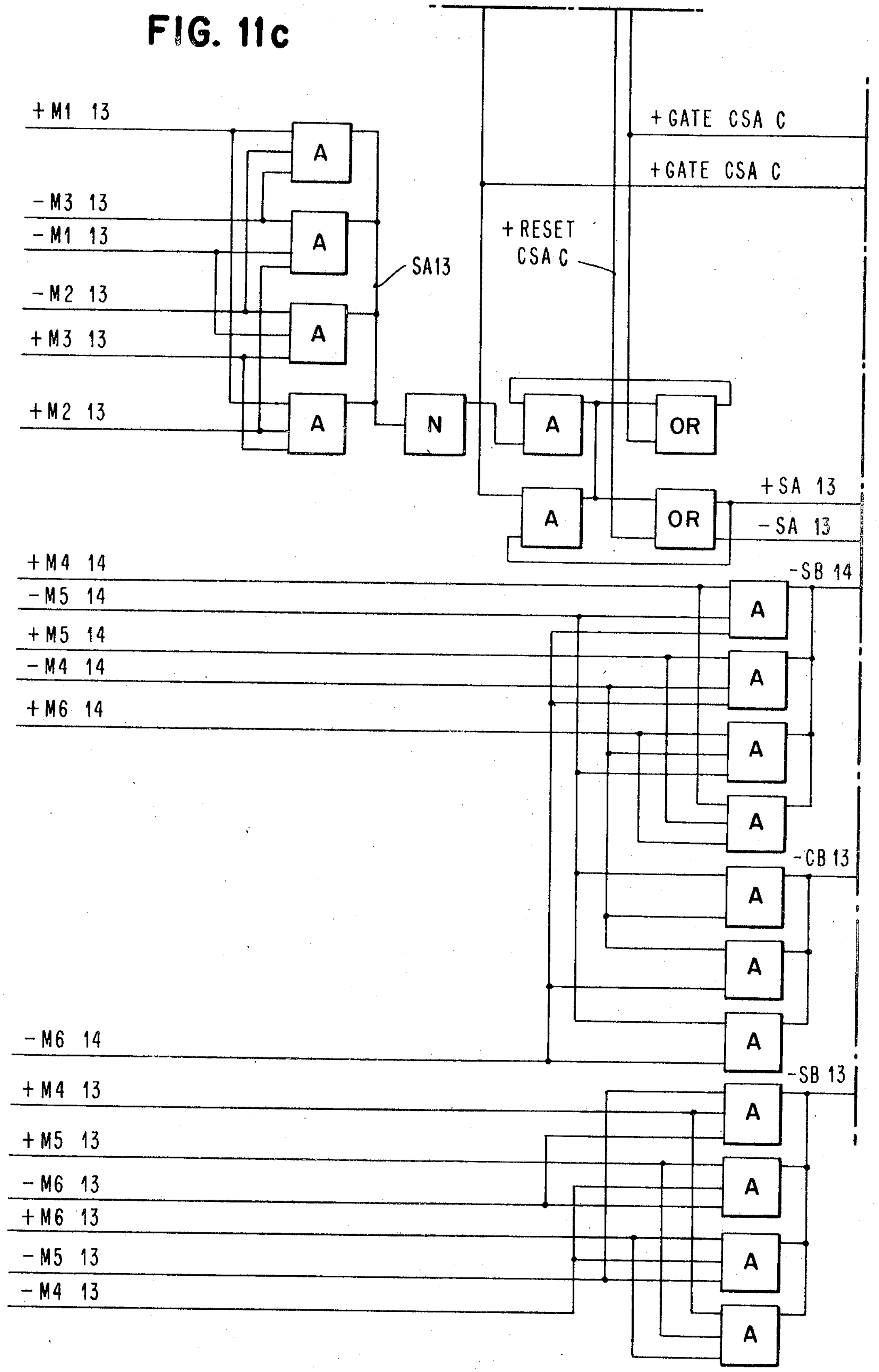
Figure 11D:
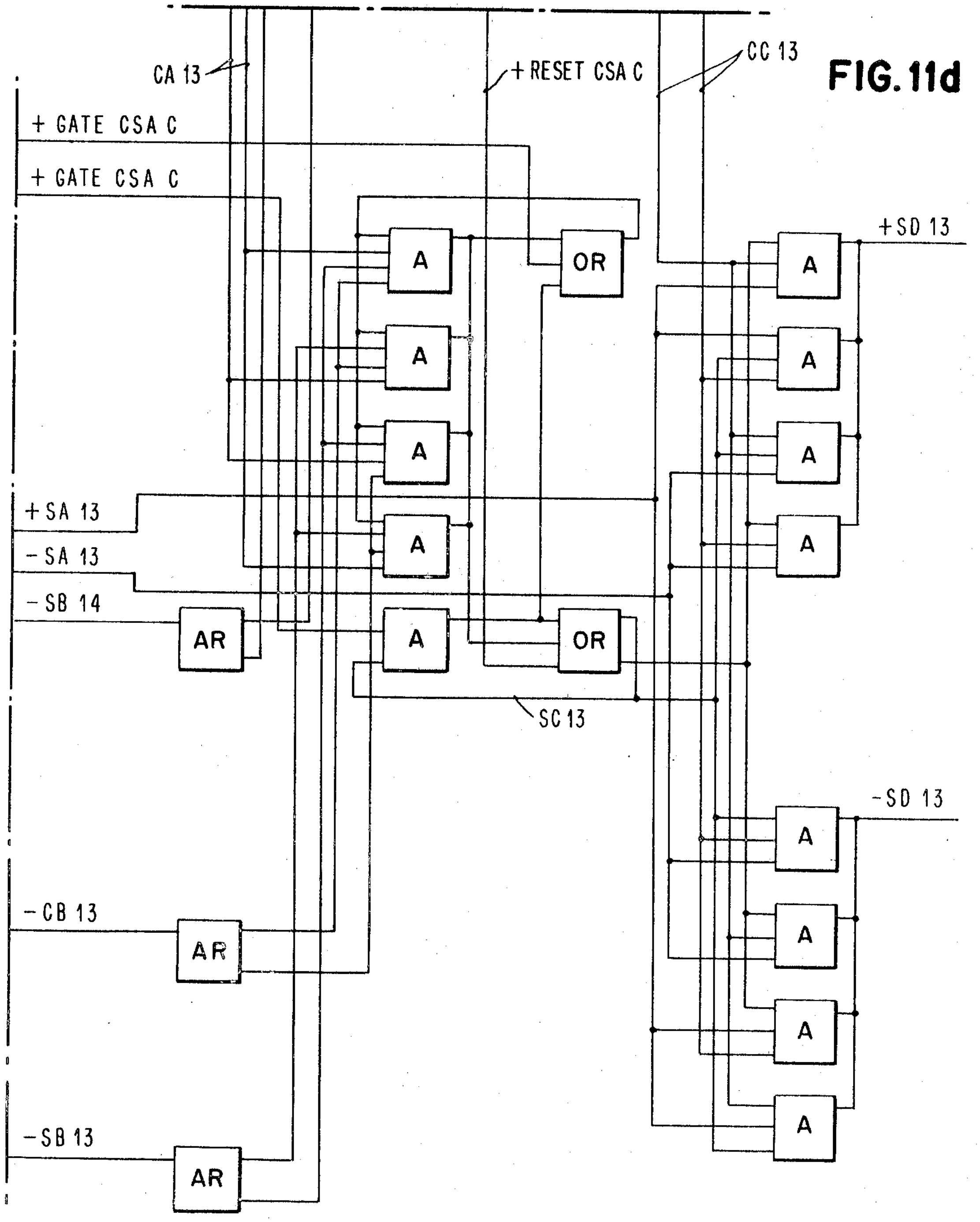

The inputs to FIGS. 11*a* and 11*c* represent the set of signal lines from latch registers 24 through 29 of FIG. 1. The logic enclosed within the dotted area 101 performs the generation of the sum function for bit position 14 of multiples M1, M2, and M3. As shown in FIG. 1, the sum function of carry-save adder 40 is latched in the latch register 43 and this is depicted in the logic enclosed within the area 102. But position 14 of multiples M1, M2, and M3, are applied to the logic enclosed within the dotted area 103 to produce the output carry function of carry-save adder 40 labelled CA–13 properly shifted to the next higher order to affect the sum generation for position 13. It should be recognized in connection with the output of FIG. 11*a* and the representation in FIG. 1 that the sum function of CSA–A is latched in latch register 43 whereas the carry function from CSA–A is applied directly to CSA–C. FIG. 11*c* shows the bit positions of multiples M4, M5, and M6 which enter into the generation of the sum and carry function for CSA–B represented by outputs from FIG. 11*c* designated SB 13, CB 13, and SB 14.

The outputs of CSA–B which are not latched and the carry function output of CSA–A which is not latched are applied to CSA–C which is a gated adder latch, a portion of which is shown within the dotted area 104 in FIG. 11*b*. The ingate to carry-save adder 42 (CSA–C) is designated +gate CSA–C which signal is applied to the gated adder latches of CSA–C and the latch register 43 utilized to latch the output of the sum function of CSA–A.

The ultimate output of the logic shown in FIGS. 11*a* through 11*d* are the +CD 13 and −CD 13 outputs representing the group of output signal lines representing the carry function for position 13 from carry-save adder 44, and +SD 13 and −SD 13 representing the group of output signal lines signalling the sum function output of carry-save adder 44.

Figure 13B:
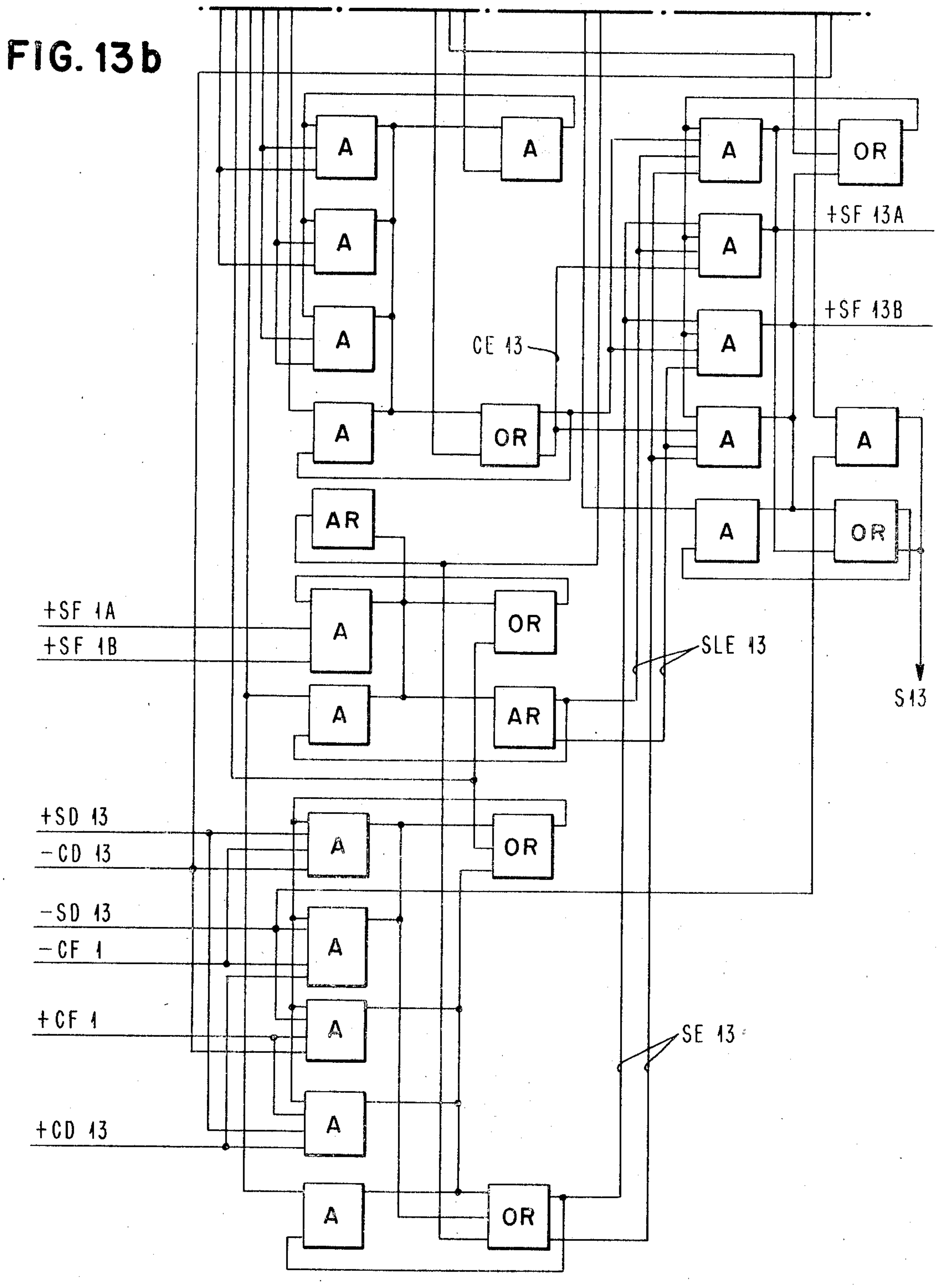

The logic shown in FIGS. 13*a* and 13*b* when arranged in accordance with FIG. 12 shows a portion of the adder loop 22 of FIG. 1 utilized to generate sum and carry signals for position 13 of a partial or final product. The adder loop includes the gated adder latch devices in the carry-save adder 50 and 52 (CSA–E and CSA–F) and the gated latch register 51. New sets of input data either from carry-save adder 44 (CSA–D) or the output of carry-save adder 52 (CSA–F) are ingated to carry-save adder 50 (CSA–E) and latch 51 in response to an ingate signal labelled −GATE CSA–E. The ingate to CSA–F is labelled −GATE CSA–F. The ultimate output of FIGS. 13*a* and 13*b* are various signal outputs of CSA–F representing the carry group of output signals (CF 13 and C 13) and the sum group of output signals (SF 13 and S 13) for bit position 13. The S 13 and C 13 signals are gated to the parallel adder 23 of FIG. 1. The SF 13 and CF 13 signals are applied to the input of CSA–E. As can be seen for example in FIG. 13*b*, two of the inputs to CSA–E are lines labelled +CF 1 and +SF 1. These input signals represent the output of carry-save adder 52 (CSA–F) which have been shifted 12 positions to the right prior to entry into the adder loop 22.

The signal lines labelled RESET in all of the figures are only effective at the end of a complete multiply operation to reset all of the latched devices to a starting state. The latched output of any of the gated latches will be maintained by the latching action and cannot be changed until such time as a new ingate is applied to the latch. Therefore, there is no separate resetting cycle for the latch devices.

There has best been shown in the previous description an adder apparatus constructed in such a fashion that successive pluralities of operands can be applied at the input of the adder apparatus at a rate which exceeds the rate at which ultimate sum values are produced from the output of the adder. This then produces an adder apparatus which is especially suitable for the high speed multiplication or division of binary numbers wherein the start of successive iterations during the multiply cycle need not await the results of previous iterations thereby providing a higher speed multiply apparatus.

While the invention has been particularly shown and described with reference to a preferred embodiment thereof, it will be understood by those skilled in the art that various changes in form and details may be made therein without departing from the spirit and scope of the invention.

What is claimed is:

1. An apparatus for adding a plurality of plural binary bit operands comprising:
- a plurality of operand input means;
- an adder tree including a plurality of groups of input signal lines, each group connected to a corresponding one of said operand input means,
- said adder tree including two groups of output signal lines, which when combined produce the sum of all the operands applied to said adder tree input lines;
- an adder loop including a plurality of groups of input signal lines and two groups of output signal lines, which when combined produce the sum of all the operands applied to said adder loop input lines;
- means connecting said adder tree output signal lines to two of said adder loop input lines;
- means connecting said adder loop output signal lines to the remaining ones of said adder loop input lines;
- and timing means, including means connected to said operand input means, operative to present successive pluralities of operands to said operand input means at a rate adapted to produce successive outputs from said adder tree at the same time as successive outputs from said adder loop which correspond to the preceding plurality of input operands.

2. Apparatus in accordance with claim 1 wherein there is further included:
- a parallel adder including two groups of input signal lines and one group of output signal lines, said output signal lines manifesting the plural bit sum of operands applied to said parallel adder input lines;
- and gating means connecting said adder loop output signal lines to said parallel adder input signal lines, and further including means connected and responsive to said timing means for selectively energizing said gating means whereby said parallel adder output lines are effective to manifest the sum of all of a plurality of operands, successive pluralities of which are presented to the inputs of said adder tree.

3. Apparatus in accordance with claim 2 wherein there is further included:
- other gating means connecting said adder tree output signal lines to said parallel adder input signal lines and including means connected and responsive to said timing means for selectively energizing said other gating means whereby said parallel adder output lines are effective to manifest the sum of only a single plurality of operands to be added.

4. Apparatus in accordance with claim 1 wherein said adder tree includes:

a plurality of adder units arranged in a plurality of adder stages each adder stage including one or more adder units, each said adder unit having three groups of input signal lines and two groups of output signal lines, which when combine, represent the sum of plural bit operands applied to said adder unit input signal lines, the output signal lines from said adder units in one of said adder stages being connected as groups of input signal lines to a succeeding one of said adder stages, the number of said adder units in each said adder stage being of a sufficient number to combine all of the complete sets of three groups of input signal lines to said adder stage.

5. Apparatus in accordance with claim 4 wherein said adder loop includes:

a first adder stage including an adder unit and latch register, and a second adder stage including one adder unit;

each of said adder units in each of said first and second loop adder stages including gated adder latch devices for each binary bit position responsive to said timing means applied to each gated adder latch, operative to gate a new set of three operand bit inputs to the device to thereby produce the next two groups of latched adder outputs, said latch register in said first loop adder stage including gated latch devices for each binary bit position responsive to said timing means applied to each gated latch device, operative to gate a new input to the latch to thereby produce another latched output, said means connecting said adder loop output signal line to said adder loop input lines including means connecting one of said groups of output signal lines as one group of input signal lines to said first stage adder unit, and the other of said group of output signal lines as inputs to said latch register, the other two groups of input signal lines to said first stage adder unit being connected to said two groups of output signal lines from the last adder stage of said adder tree, said gated adder latch devices of said second loop adder stage receiving as inputs the two groups of output signal lines from said gated adder latch of said first stage and the group of output signal lines from said gated latch register.

6. Apparatus in accordance with claim 5 wherein predetermined ones of said adder stages in said adder tree further includes:

gated latch registers, each responsive to said timing means and a group of input signal lines not included in a set of three groups of input signal lines to one of said adder units in said predetermined stage, operative to gate a new group of input signals to said gated latch register to thereby produce another group of latched output signals, said adder units in said predetermined adder tree stage being comprised of gated adder latch devices connected and responsive to said timing means, operative to gate a new set of three groups of inputs to the device to thereby provide the next two groups of output signals in response to successively applied groups of input signals, 7. Apparatus in accordance with claim 6 wherein said device further includes:

operand selection means, connected and responsive to said timing means and operand selection signals, operative to simultaneously select and transmit to said plurality of operand input means a plurality of operands to be added, said operand selection means including gated latch devices operative to be successively set with a predetermined number of operand selection signals whereby a predetermined number of successive pluralities of operands are transmitted to said plurality of operand input means, and wherein said operand input means are each comprised of gated latch devices for each binary bit position, connected to said timing means and said operand selection means, operative to periodically gate successively applied input signals to the device to be latched and thereby provide a group of operand output signals to a corresponding group of input signal lines to the first adder stage of said adder tree.

8. Apparatus in accordance with claim 7 wherein said timing means includes:

gate generating means for producing $x$ gating pulses wherein the product of $x$ times the number of operand input means equals the total number of operands to be added, said gating pulses being connected to said operand selection means, operative to gate $x$ successive sets of selection signals to said gated latch devices;

delay line means, connected to said gate generating means operative to produce timing pulses, in sequence, for each of said $x$ gating pulses;

and means connecting said timing pulses, in sequence, to said operand input means, said predetermined stages of said adder tree, said first adder stage of said adder loop, and said second adder stage of said adder loop.

9. Apparatus in accordance with claim 8 wherein:

successive outputs from said second adder stage of said adder loop occur at predetermined intervals, said interval being substantially equal to the logic and circuit delays encountered by signals propagating from the input to the output of said adder loop, wherein the logic and circuit delays encountered by signals between the inputs to sequentially effective gated latches or gated adder latches is substantally equal to said predetermined interval, and wherein the interval between said gating pulses is substantially equal to said predetermined interval.

References Cited

UNITED STATES PATENTS

| | | | |
|---|---|---|---|
| 3,115,574 | 12/1963 | Paul et al. | 235—164 |
| 3,253,131 | 5/1966 | MacSorley | 235—175 X |
| 3,340,388 | 9/1967 | Earle | 235—176 |
| 3,278,732 | 10/1966 | Haynes | 235—164 |
| 3,311,739 | 3/1967 | Aiken et al. | 235—164 |

OTHER REFERENCES

C. S. Wallace, A Suggestion for a Fast Multiplier, IEEE Transactions on Electronic Computers, February 1964, pp. 14–17.

EUGENE G. BOTZ, Primary Examiner

D. H. MALZAHN, Assistant Examiner

U.S. Cl. X.R.

235—168